United States Patent [19]

Mizoshita

[11] Patent Number: 4,562,499
[45] Date of Patent: Dec. 31, 1985

[54] MAGNETIC DISK UNIT

[75] Inventor: Yoshifumi Mizoshita, Yokohama, Japan

[73] Assignee: Fujitsu Limited, Kawasaki, Japan

[21] Appl. No.: 395,028

[22] PCT Filed: Oct. 23, 1981

[86] PCT No.: PCT/JP81/00297
§ 371 Date: Jun. 21, 1982
§ 102(e) Date: Jun. 21, 1982

[87] PCT Pub. No.: WO82/01616
PCT Pub. Date: May 13, 1982

[30] Foreign Application Priority Data

Oct. 29, 1980 [JP] Japan .................. 55-151571

[51] Int. Cl.$^4$ ............ G11B 5/012; G11B 5/016; G11B 5/82
[52] U.S. Cl. ............................. 360/98; 360/99; 360/135
[58] Field of Search ........... 360/98, 99, 137, 135, 360/86, 102, 103, 105, 133; 346/137

[56] References Cited

U.S. PATENT DOCUMENTS

| 3,688,289 | 8/1972 | Schnell | 346/137 |
| 3,706,085 | 12/1972 | Mowrey | 360/98 |
| 4,143,408 | 3/1979 | McGinnis | 360/99 |
| 4,205,357 | 5/1980 | Barton | 360/135 |
| 4,396,964 | 8/1983 | Morehouse | 360/98 |
| 4,412,261 | 10/1983 | Tateyama | 360/98 |

FOREIGN PATENT DOCUMENTS 2452153 3/1980 France .

Primary Examiner—Robert M. Kilgore
Attorney, Agent, or Firm—Staas & Halsey

[57] ABSTRACT

A magnetic disk unit wherein a plurality of magnetic recording disks are mounted at predetermined intervals on a rotatably supported spindle via a magnetic recording disk mounting member having air ventilating holes which extend from the upper and lower portions thereof near the spindle to the spaces between the magnetic disks, air being circulated by the centrifugal force generated by rotation of the magnetic recording disks.

13 Claims, 7 Drawing Figures

FIG. 4B.
FIG. 4A.
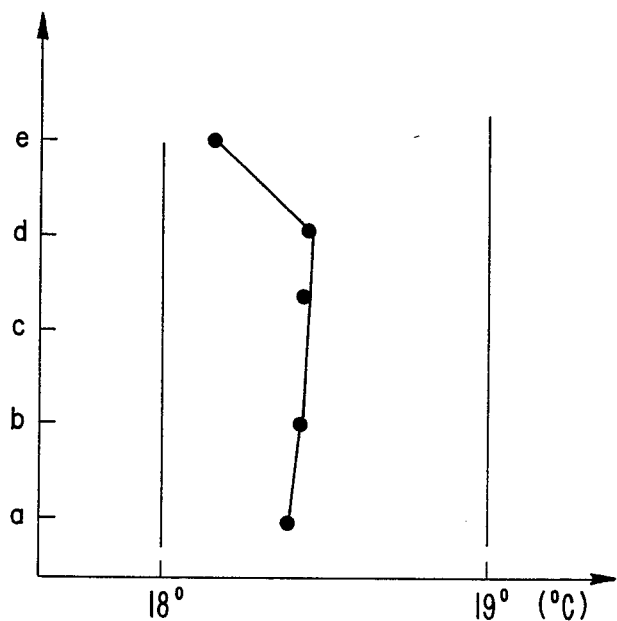
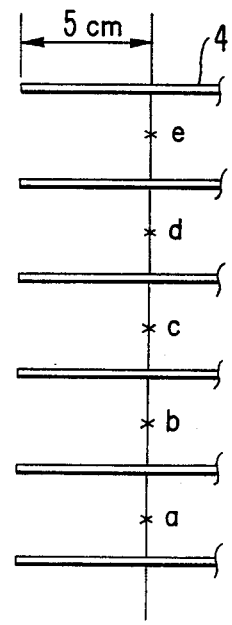
FIG. 5.
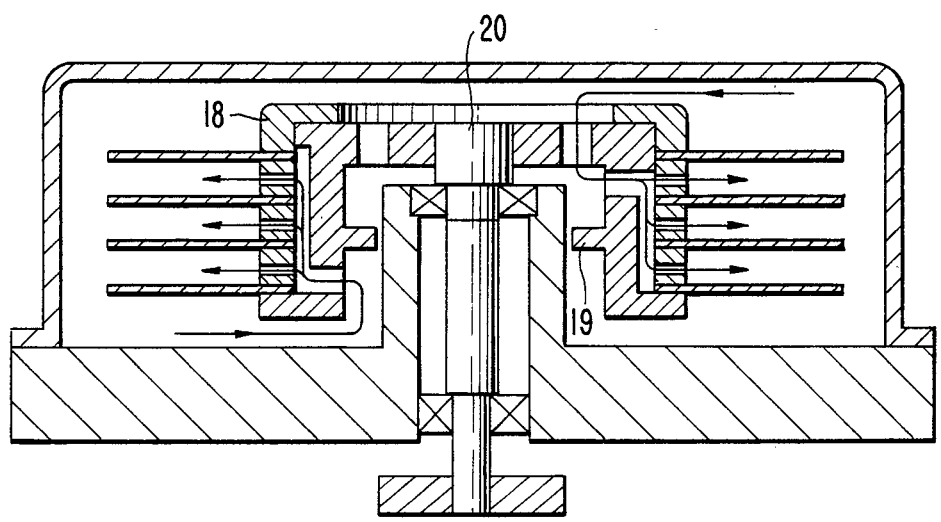

MAGNETIC DISK UNIT

BACKGROUND OF THE INVENTION

This invention relates to a magnetic disk unit which mounts a plurality of magnetic disks and which equalizes temperature differences between individual magnetic disks.

A typical magnetic disk unit employs a plurality of magnetic recording disks stacked concentrically at predetermined intervals and rotates them at a predetermined number of rotations, and positions the magnetic head for each magnetic recording disk for magnetic recording (data entry) or reproduction (data reading).

In the case of such a magnetic disk unit, respective magnetic recording disks are mounted on the same spindle and are driven by the same driving source. Simultaneously, one or more magnetic heads are provided at each magnetic recording surface of each magnetic recording disk and these magnetic heads move together with respect to the disks because they are also driven by the same driving souce. On the other hand, such a magnetic disk unit provides only one surface of magnetic recording disk for recording the positioning servo information for positioning the magnetic head at the desired area on the magnetic recording surface of each magnetic recording disk. Therefore, entry and reading of information to/from the desired area of the desired magnetic recording surface can be done as follows. While a magnetic head reads the positioning servo information from the correspondng magnetic recording disk surface, another magnetic head driven by the same driving source is moved to the desired area and positioned therein.

Such a magnetic disk unit is required to have remarkable accuracy for positioning the magnetic head in the desired area.

Presently, magnetic disk units have the following problem with respect to high accuracy in positioning. Namely, the recording surface of the magnetic recording disk recording the servo information and the recording surface of the other magnetic recording disks used for ordinary data entry and reading are in different corresponding relationships.

This will be explained in detail. If the recording surface of the magnetic recording disk recording the servo information and the recording surface of a magnetic recording disk for ordinary data entry and reading are in different corresponding relationships on the occasion of positioning the magnetic head at the desired area in order to enter/read the data to/from the desired area of the magnetic disk, the enter/read magnetic head is not accurately positioned at the desired recording surface even if the servo magnetic head is positioned accurately at the recording surface of the magnetic disk recording the servo information. This problem results, to a considerable degree, from temperature differences between the magnetic recording disks.

Existing magnetic recording disks often uses aluminium as the basic material and therefore the difference in thermal expansion due to temperature differences is the principal cause of the problem.

Therefore, measures have been taken with the existing magnetic disk unit, so that the temperature distribution becomes equal at least within the shroud or cover by accommodating a plurality of magnetic recording disks in the shroud and circulating air within the shroud by the centrifugal force generated due to rotation of the magnetic recording disks. In such a structure, the air is introduce from the area near the spindle mounting the magnetic recording disks and this air is released between respective magnetic recording disks.

However, this existing air circulating system has a disadvantage in that temperature cannot be prefectly equalized because the air flows unequally between respective magnetic recording disks. As a result, it has been impossible for the existing magnetic disk unit to sufficiently reduce temperature differences between respective magnetic recording disks.

SUMMARY OF THE INVENTION

It is an object of the present invention to provide a magnetic disk unit which reduces the temperature differences between respective magnetic recording disks and reduces the differences in thermal expansion between respective magnetic recording disks.

This object of the present invention can be attained by a magnetic disk unit having a structure wherein a plurality of magnetic disks are mounted on a rotatably supported spindle via the magnetic recording disk mounting member having ventilating holes which connect areas near the spindle and the gaps between the magnetic recording disks so that air is circulated by the centrifugal force generated by rotation of the magnetic recording disks. These air ventilating holes extend to the gaps between the magnetic recording disks from the upper and lower spindle portions of the magnetic recording disk mounting member, causing the air in the area near to the upper and lower spindle portions mentioned above to be circulated into the gaps between the magnetic recording disks.

BRIEF DESCRIPTION OF THE DRAWINGS

FIG. 4 shows temperature measuring points between the magnetic recording disks of the magnetic disk unit and the results of the measurements, with FIG. 4(A) showing the measuring points and FIG. 4(B) showing the results of the measurements, respectively;
FIG. 5 is a sectional view of another embodiment of the magnetic disk unit of the present invention.

DESCRIPTION OF THE PREFERRED EMBODIMENT

The present invention will be explained in detail with reference to the attached drawings. First, the present invention will be explained in comparison with the prior art.

Figure 1:
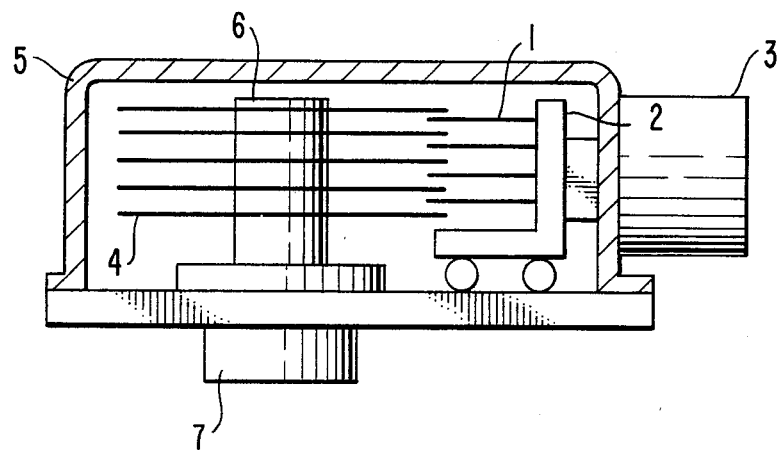
FIG. 1 shows the concept of the magnetic disk unit.

As is shown in FIG. 1, a magnetic disk unit mounts a plurality of magnetic heads 1 on a movable support called a carriage 2, and thereby the magnetic heads are moved to the desired area on the magnetic recording disks 4 by a solenoid-controlled device such as voice coil motor 3 or hydraulic motor. 5 is the cover, 6 is the spindle and 7 is the driver.

Recently, however, the requirement for realizing a large capacity in such a unit inevitably makes the width of the tracks for recording data very narrow and as a result the positioning accuracy of the magnetic heads 1 is more strict than in the existing unit. A notable factor determining this positioning accuracy is the relative positional deviation between respective heads 1 resulting from differences in thermal expansion resulting from the atmosphere within the magnetic disk unit, particularly due to temperature differences in the spaces between the magnetic recording disks 4.

Figure 2:
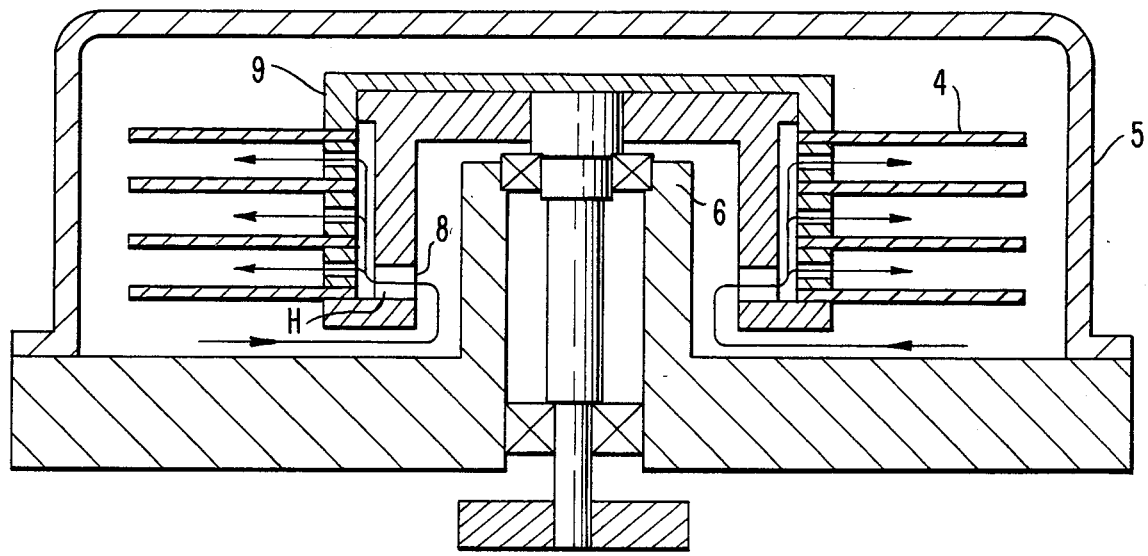
FIG. 2 is an example of the existing magnetic disk unit.

As a method for diminishing such temperature differences, air can be circulated by providing ventilating holes H, which extend from the area near the center spindle 6 to the spaces formed between the magnetic recording disks 4 in the magnetic recording disk mounting member 9 as shown in FIG. 2 (the magnetic head access mechanism is deleted form simplification). Thereby temperature differences in the radial direction in the spaces between magnetic recording disks 4 are drastically improved, but the effect for temperature differences in the vertical direction (in the direction where the magnetic recording disks 4 are stacked) is insufficient.

The reason for the insufficiency is that the air inlet 8 is provided, in the above existing method in at an upper or lower area near the center of the spindle 6, so that the air circulation system within the magnetic disk unit becomes asymmetrical in the vertical direction and as a result temperature differences are generated in the spaces between the magnetic disks 4 in the stacking direction. In addition, even if air inlets are provided at two areas in the upper and lower portions, the existing method cannot bring about sufficient circulation of air. The reason for this is that the air circulation system must be divided into two portions in the vertical direction, at the center in the stacking direction of the magnetic disks.

An embodiment of the magnetic disk unit of the present invention will be explained below.

Figure 3:
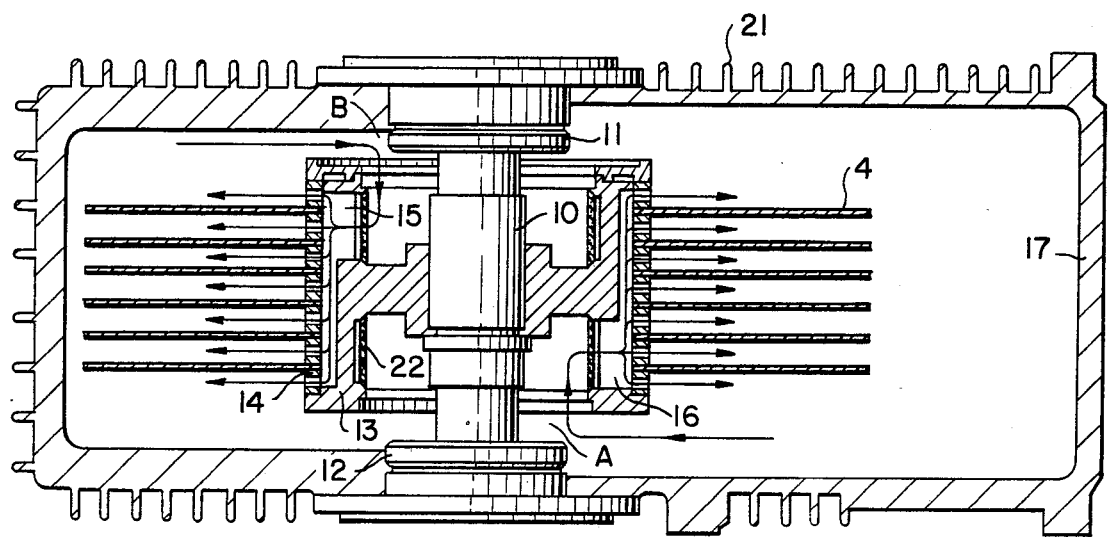
FIG. 3 shows a sectional view of an embodiment of the magnetic disk unit of the present invention.

FIG. 3 is a sectional view for explaining an embodiment of the magnetic disk unit of the present invention. In this figure, the magnetic disk unit employs a so-called double-supported type spindle 10 which is supported at both upper and lower ends with the bearings 11 and 12. In this figure, the magnetic head access mechanism is omitted for simplification. The magnetic recording disks 4 are mounted at equal intervals on the spindle 10 by the hub (mounting member) 13 and the spacer 14 having holes. The space A communicates with the spaces between the magnetic disks 4 via ventilating hole 16, and therefore the air input from the space A under the hub 13 flows toward the circumference of the disks 4 due to the rotation of the magnetic disks 4. In the same way, ventilating holes 15 permit air to flow from the space B at the upper portion of the hub 13 to the spaces between disks 4, and therefore the air input from the space B in the upper portion of the hub 13 due to rotation of the magnetic disks 4 flows toward the circumference of the disks 4. Ventilating holes 15 and 16 which are provided at the circumference of the hub 13, at the top and bottom ends as explained above, allow air to flow in from the upper portion of the disks 4 and the lower portion of disks 4 into the same spaces formed between said disks 4 and uniformly mix the air therein. Reference number 17 represents the case.

In the above embodiment, the magnetic disk unit consisting of six disks 4 each ten inches in diameter is encased in an aluminium case 17 measuring 10 mm thick and having an outer diameter of 400 mm and a height of 150 mm. For the following test, the magnetic disks were rotated at a rate of 4000 rpm.

As is shown in the graph of FIG. 4(B) which plots the height of the stack of disks 4 on the vertical axis and the temperature on the horizontal axis, a rather unified temperature range including which includes less than one degree fluctuation is obtained at each of the measuring points a, b, c, d and e in the spaces between the disks 4. If the fluctuation were one degree, an "offtrack" deviation of about 3 $\mu$m is generated; temperature differences of more than two degrees are not allowed for a magnetic disk unit which assures high recording density.

As is explained above, the air ventilating holes 15 and 16 are provided at the circumference of hub 13 to assure that the air flowing in from the upper and lower portions of the stack of disks is mixed in the same spaces between the disks so that each space between the disks is placed at almost the same temperature and the relative positional displacement between the heads generated by temperature differences is reduced, and thereby the information track width can be narrower than in existing tracks and a magnetic disk unit having a large storing capacity can be realized.

Explained above is an example of adapting the present invention in a magnetic disk unit utilizing a double-supported type spindle, but the present invention provides the same effect when it is adapted in a magnetic disk unit utilizing a single-supported spindle as shown in FIG. 5. In this figure, the projected portion 19 is provided at the inside center of hub 18 in order to provide the same function as the structure shown in FIG. 3 by vertically isolating the space formed by the spindle 20 and hub 18 into two portions.

The structure of FIG. 3 will now be further explained in detail. The case 17 is provided with heat radiating fins in order to cool the inside of the magnetic disk unit.

The magnetic disk mounting member (hub) 13 which forms the air circulating path is provided with the filters 22 which purify the air within the case while the air is circulating.

Figure 6:
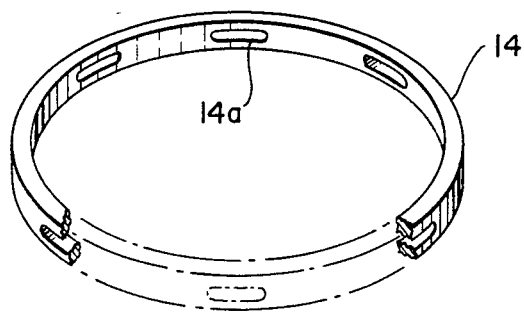
FIG. 6 illustrates one of the spacers which hold the magnetic recording disks shown in FIG. 3 and FIG. 4 at the predetermined intervals.

FIG. 6 illustrates the practical structure of the spacers 14 used in FIG. 3 and FIG. 5.

A spacer 14 is provided with holes 14a at predetermined intervals, as shown in the figure, and these holes allow the air to be exhausted into the spaces between the magnetic disks 4.

As is shown in FIG. 4, the temperature at the point e, among the measuring points between the magnetic recording disks 4, diviates more than the temperature the other points.

This temperature difference is less than 0.5 degree and in practice does not give rise to any adverse effects, but it is apparent that if future magnetic disk units with higher recording density capabilities require further reduction of the temperature differences, this can be accomplished by controlling the amount of of air flowing out by changing the diameter of the air exhaustion holes 14a bored in said spacer 14.

The present invention has been described above with reference to the preferred embodiments and makes a magnetic disk unit assuring little relative positional deviation between heads and high recording density through narrow track width a reality, on account of a structure such that one or more air ventilating holes which respectively extend to the spaces between magnetic disks from both upper and lower portions near the center of the spindle are provided at the hub, so that the air in the space near both upper and lower portions of the spindle is mixed in the spaces between magnetic disks and the temperature differences in the vertical stacking direction in the spaces between the magnetic disks can be abated.

In the above explanation, emphasis is placed on the fact in that the thermal expansion of magnetic recording disks can be equalized, but this effect is also obtained with the arms etc., for supporting to the magnetic heads.

What is claimed is:

1. An improved magnetic disk unit of the type wherein a plurality of magnetic disks are mounted at predetermined intervals on a magnetic recording disk mounting member which is mounted on a rotatable spindle, the magnetic recording disk mounting member having a ventilating hole which connects an area near said spindle and the spaces between magnetic recording disks so that air is circulated by the centrifugal force generated by rotation of said magnetic recording disks, wherein the improvement comprises: said magnetic recording disk mounting member has air ventilating holes which extend to the spaces between said magnetic recording disks from the upper and lower spindle portions of said magnetic recording disk mounting member to cause the air in the areas near said upper and lower spindle portions to be uniformly mixed and circulated into the spaces between said magnetic recording disks to equalize the temperature in the spaces between said magnetic recording disks and the temperature of the disks.

2. A magnetic disk unit as claimed in claim 1, further comprising a case disposed around said plurality of magnetic recording disks, said case being provided with heat radiation fins.

3. A magnetic disk unit as claimed in claim 1, further comprising air purification filters mounted on the magnetic recording disk mounting member and covering the air ventilating holes.

4. A magnetic disk unit, comprising:
   a housing;
   a spindle mounted for rotation within the housing;
   a plurality of magnetic disks, each having a central aperture;
   spacing means adjacent the central aperture of each disk for supporting the disks at spaced-apart positions in a generally cylindrical stack of disks, said stack of disks having a first end and a second end, said spacing means having a plurality of first apertures therethrough connecting the regions between the disks and the region inward of the central apertures of the disks; and
   mounting member means for mounting said stack of disks to said spindle while providing a cavity communcating with the first apertures, said mounting member means including ventilating means for communicating air from the region adjacent the first end of the stack of disks to the cavity and for communicating air from the region adjacent the second end of the stack of disks to the cavity so that the air communicated from the first and second ends of the stack of disks is uniformly mixed and circulated in the regions between the disks to equalize the temperature in the regions between the disks and the temperature of the disks.

5. The unit of claim 4, further comprising first and second bearing means for rotatably supporting said spindle, said stack of disks being positioned between said first and second bearing means, and wherein said mounting member means comprises a generally cylindrical portion adjacent the central portion between the disk portion and the second end of the stack of disks.

6. The unit of claim 5, wherein said spacing means comprises a plurality of rings each positioned adjacent to and concentric with the central aperture of a magnetic disk, the first apertures being provided through said rings.

7. The unit of claim 6, wherein the first apertures through one ring have dimensions different from the first apertures through another ring.

8. The unit of claim 6, further comprising filter means mounted on said generally cylindrical portion for filtering air as it circulates through said second apertures.

9. The unit of claim 4, further comprising bearing means for rotatably supporting said spindle with one end thereof protruding beyond said bearing means, wherein said mounting member means comprises a generally cylindrical portion adjacent the central apertures of the disks and a generally disk-shaped portion connecting said one end of said spindle to the cylindrical portion, said cylindrical portion having a centrally disposed abutment protruding toward said spindle, and wherein said ventilating means is provided by at least one said second aperture through said disk-shaped portion, at least one second aperture through the cylindrical portion on one side of the protruding portion, and at least one second aperture through the cylindrical portion on the other side of the protruding portion.

10. The unit of claim 9, wherein said spacing means comprises a plurality of rings each mounted adjacent to and concentric with the central aperture of a magnetic disk, the first apertures being provided through said rings.

11. The unit of claim 10, wherein the first apertures through one ring have dimensions different from the first apertures through another ring.

12. The unit of claim 11, further comprising filter means mounted on said mounting member means for filtering air as it circulates through said second apertures.

13. A magnetic disk unit as claimed in claim 1, wherein the magnetic recording disk mounting member has an air ventilating hole extending from the upper spindle portion to the spaces between the magnetic recording disks and an air ventilating hole extending from the lower spindle portion to the spaces between the magnetic recording disks.

* * * * *

UNITED STATES PATENT AND TRADEMARK OFFICE
CERTIFICATE OF CORRECTION

PATENT NO. : 4,562,499

DATED : December 31, 1985

INVENTOR(S) : Mizoshita

It is certified that error appears in the above-identified patent and that said Letters Patent is hereby corrected as shown below:

Col. 2, line 2, "introduce" should be --introduced--;
       line 22, "via the" should be --via a--.

Col. 3, line 11, after "center" insert --of--;
       line 23, "method in" should be --method,--;
       line 46, "spacer 14" should be --spacers 14--;
       line 48, "hole" should be --holes--.

Col. 4, line 6, delete "including";
       line 39, delete "the" (second occurrence);
       line 46, delete "the" (first occurrence);
       line 50, after "temperature" insert --of--;
       line 57, "of of" should be --of--.

UNITED STATES PATENT AND TRADEMARK OFFICE
CERTIFICATE OF CORRECTION

PATENT NO. : 4,562,499 PAGE 2 of 2
DATED : December 31, 1985
INVENTOR(S) : Mizoshita It is certified that error appears in the above-identified patent and that said Letters Patent is hereby corrected as shown below:

Col. 5, line 7, delete "in";
line 9, delete "to";
line 55, "muncating" should be --municating--.

Col. 6, [Claim 5], line 12, after "central" INSERT
--apertures of the disks and a generally disk-shaped
portion connecting the cylindrical portion to
the spindle, the disk-shaped portion being
positioned between the first and second ends of
the stack of disks, said ventilating means being
provided by at least one second aperture through
said cylindrical portion between the disk-shaped
portion and the first end of the stack of disks
and at least one second aperture through the
cylindrical--.

Signed and Sealed this

Thirteenth Day of May 1986

[SEAL]

Attest:

DONALD J. QUIGG

Attesting Officer   Commissioner of Patents and Trademarks